Figure 1:
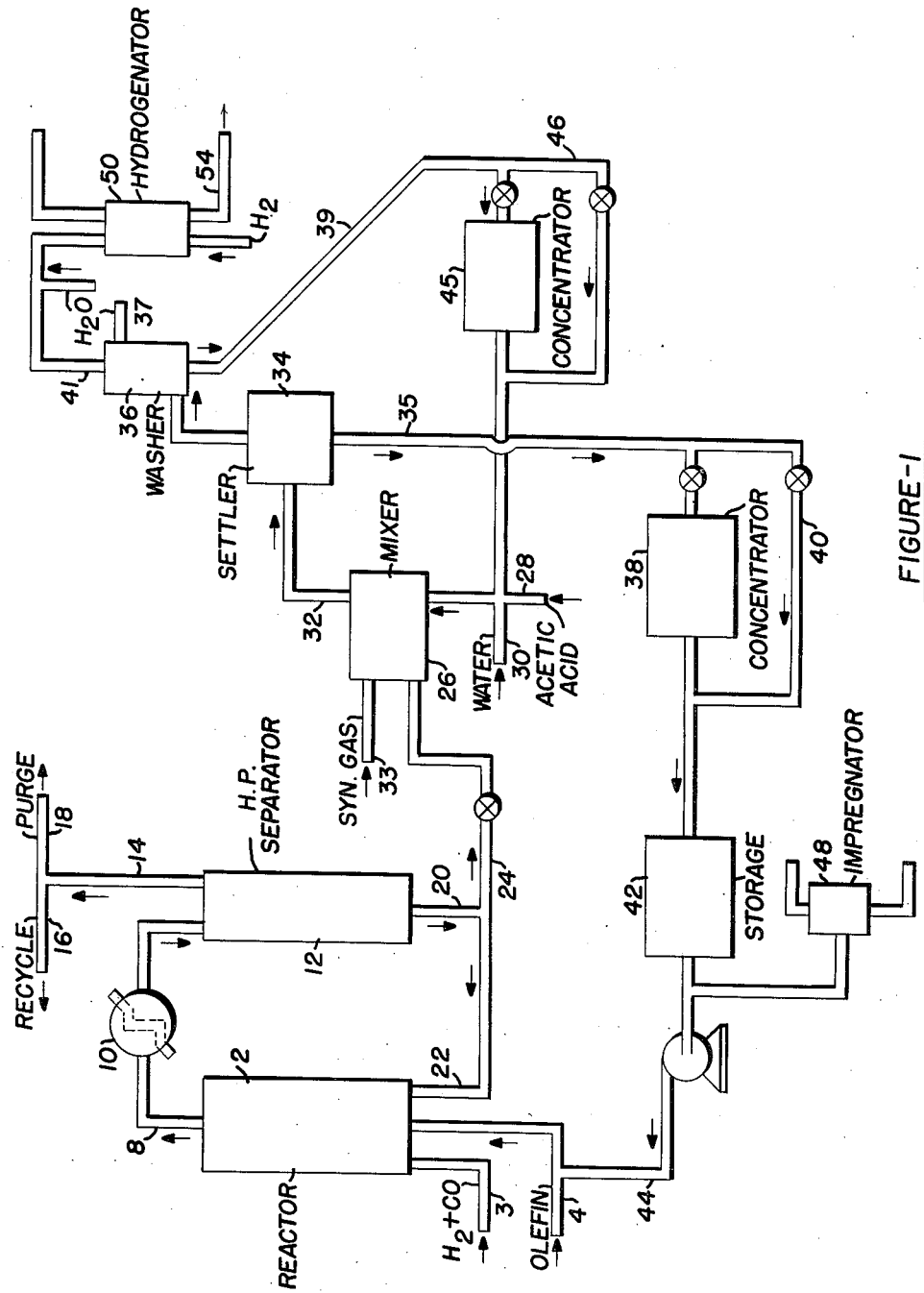

Joseph K. Mertzweiller    Inventor

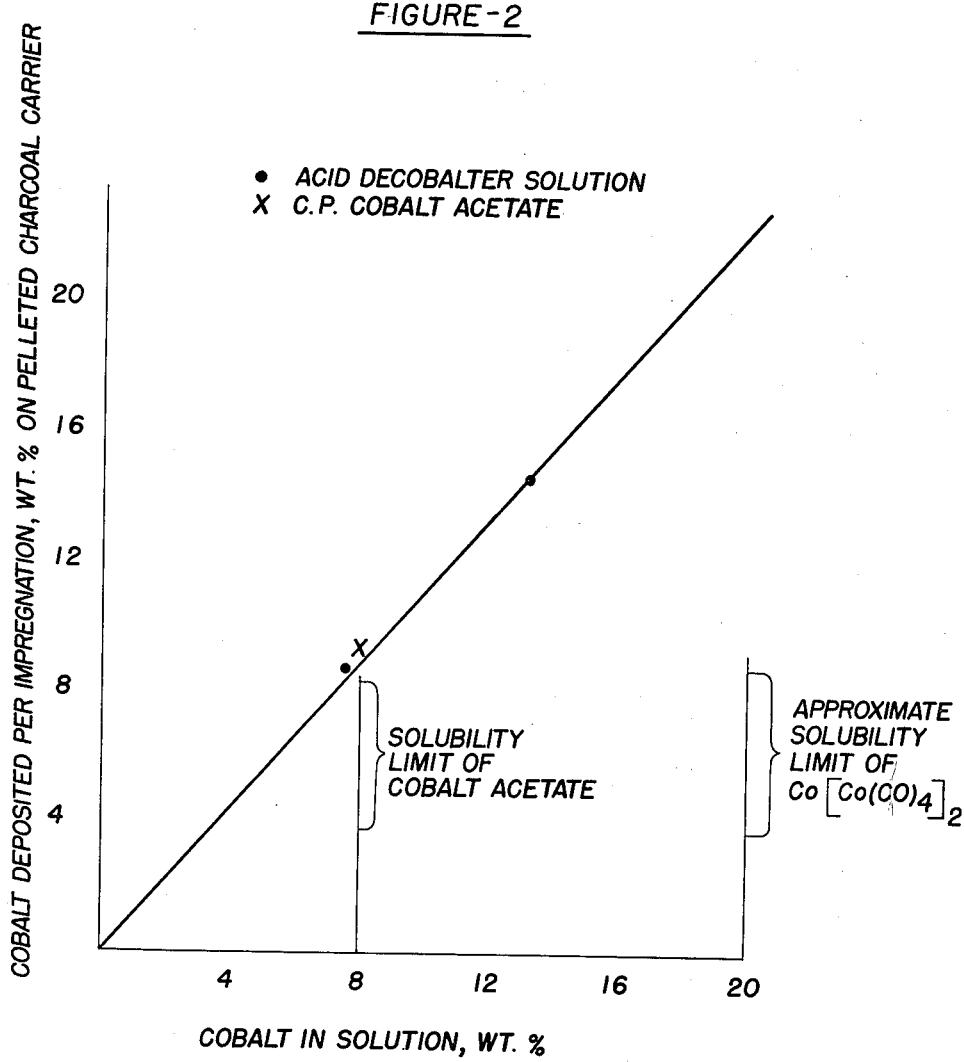

United States Patent Office 2,808,443
Patented Oct. 1, 1957

2,808,443
COBALT HYDROGENATION CATALYSTS

Joseph K. Mertzweiller, Baton Rouge, La., assignor to Esso Research and Engineering Company, a corporation of Delaware Application March 16, 1954, Serial No. 416,483

12 Claims. (Cl. 260—638)

The present invention relates to the preparation of organic compounds by the reaction of carbon monoxide and hydrogen with carbon compounds containing olefinic linkage in the presence of a cobalt carbonylation catalyst. More specifically, the present invention relates to the preparation of a hydrogenation catalyst particularly adapted to hydrogenate the reaction products of the first, or aldehyde synthesis, stage of the reaction. Still more specifically, the present invention relates, in one of its embodiments, to the preparation of a hydrogenation catalyst from a reaction product of the process.

The present invention is a continuation-in-part of Serial No. 285,206, filed April 30, 1952, now Patent No. 2,757,205.

It is now well known in the art that oxygenated organic compounds may be synthesized from organic compounds containing olefinic linkages by a reaction with carbon monoxide and hydrogen in the presence of a catalyst-containing metal of the iron group, such as cobalt, in an essentially three-stage process. In the first stage, the olefinic material, catalyst and the proper proportions of CO and $H_2$ are reacted to give a product consisting predominantly of aldehydes containing one more carbon atom than the reacted olefin. This oxygenated organic mixture, which contains dissolved in it, salts and the carbonyls and molecular complexes of the metal catalyst, is treated in a second stage to cause removal of soluble metal compounds from the organic material in a catalyst removal zone. The catalyst-free material is then generally hydrogenated to the corresponding alcohols, or may be oxidized to the corresponding acid.

This carbonylation reaction provides a particularly attractive method for preparing valuable primary alcohols which find large markets, particularly as intermediates for plasticizers, detergents and solvents. Amenable to the reaction are long and short chained olefinic compounds, depending upon the type alcohols desired. Not only olefins, but most organic compounds possessing at least one non-aromatic carbon-carbon double bond may be reacted by this method. Thus, straight and branch-chained olefins and diolefins, such as propylene, butylene, pentene, hexene, heptene, butadiene, pentadiene, styrene, olefin polymers, such as di- and tri-isobutylene and hexene and heptene dimers, polypropylene, olefinic fractions from the hydrocarbon synthesis process, thermal or catalytic cracking operations, and other sources of hydrocarbon fractions containing olefins, may be used as starting material, depending upon the nature of the final product desired.

The catalyst in the first stage of the process is usually added in the form of salts of the catalytically active metal with high molecular fatty acids, such as stearic, oleic, palmitic, naphthenic, etc., acids. Thus, suitable catalysts are, for example, cobalt oleate or naphthenate. These salts are soluble in the liquid olefin feed and may be supplied to the first stage as hydrocarbon solution or dissolved in the olefin feed.

The synthesis gas mixture fed to the first stage may consist of any ratio of $H_2$ to CO, but preferably these gases are present in about equal volumes. The conditions for reacting olefins with $H_2$ and CO vary somewhat in accordance with the nature of the olefin feed, but the reaction is generally conducted at pressures in the range of about 1500–4500 p. s. i. g. and at temperatures in the range of about 150–450° F. The ratio of synthesis gas to olefin feed may vary widely; in general, about 2500 to 15,000 cubic feet of $H_2$+CO per barrel of olefin feed are employed.

At the end of the first stage, when the desired conversion of olefin to oxygenated compounds has been effected, the product and unreacted material are generally withdrawn to a catalyst removal zone, where dissolved catalyst is removed from the aldehyde mixture, and thereafter the reaction products are transferred to a hydrogenation zone and the products reduced to the corresponding alcohol. It is to the last two named zones that an important embodiment of the present principal invention applies.

The use of sulfur-sensitive catalysts, such as nickel or copper chromite, or sulfur insensitive catalysts, such as molybdenum, nickel or tungsten sulfide, for hydrogenation of carbonyl groups is well-known, even in the comparatively recent olefin carbonylation reaction or alcohol synthesis reaction art. Each type of catalyst has its own advantages and disadvantages when employed in this service. Thus, nickel, supported or unsupported, is a highly active and selective hydrogenation catalyst, but is sensitive to the presence of small concentrations of carbon monoxide in the hydrogen at normal operating temperatures for this catalyst, which is about 200–400° F. Above this temperature, though sensitivity to CO, resulting in nickel carbonyl formation, decreases, overhydrogenation of the aldehyde to the corresponding hydrocarbon becomes more pronounced. Copper chromite is also an active and highly selective hydrogenation catalyst for carbonyl linkages, and is quite insensitive to carbon monoxide. However, it is of insufficient physical strength for use in large-scale commercial operations, particularly when water is present. In the hydrogenation of the aldehyde product resulting from the carbonylation reaction, water has been found to be an excellent reaction modifier to increase selectivity to alcohol. This in part is due to the fact that the first stage reaction product comprises not only aldehydes but also alcohols and acetals and other secondary reaction products.

Sulfactive hydrogenation catalysts, particularly those supported on preformed activated carbon, such as molybdenum sulfide, have shown themselves to be admirably suited to hydrogenation of aldehydes resulting from the carbonylation reaction in that they are of high physical strength and insensitive to carbon monoxide and to sulfur compounds, both impurities being usually found present in the feed stream to the reactors. However, these catalysts are less active and selective than the sulfur-sensitive catalysts. For instance, in the hydrogenation of a crude amyl aldehyde mixture obtained by carbonylating butylenes, a substantial amount of $C_{10}$ hydrocarbons are formed. The latter boil in the range of the desired primary amyl alcohol product and thus are difficult to separate by distillation. Though the sulfur-sensitive type of catalysts, such as nickel, does not give significant amounts of the $C_{10}$ hydrocarbon, it is sensitive to carbon monoxide as well as sulfur, and thus requires use of expensive methanization equipment.

It is therefore the principal purpose of the present invention to set forth a catalyst for the hydrogenation of aldehydes which possesses good physical strength, insensitivity to carbon monoxide, and which will not give rise to significant amounts of hydrocarbon contaminants when employed in the hydrogenation of aldehydes narticularly those of low molecular weight, prepared by the carbonylation of olefins.

It is also a purpose of the present invention to set forth a novel process for preparing a catalyst for this purpose.

A still further purpose and object of the present invention is to prepare a supported cobalt catalyst by a novel process whereby there is obtained a catalyst composition containing a substantially higher proportion of active catalytic constituent than has hitherto been found possible.

Other and further objects, purposes and advantages of the present invention will become apparent hereinafter.

It has now been found that certain supported catalysts containing cobalt as the active catalytic agent are exceptionally well adapted to the hydrogenation of carbonylation aldehydes, particularly those of lower molecular weight. More particularly, it has been found that a reduced cobalt catalyst supported on performed activated carbon pellets combines high physical strength with high alcohol and low hydrocarbon selectivity. The cobalt catalyst is also characterized by the property of being selective to alcohols at a higher temperature than that characteristic of nickel. Thus, supported cobalt catalyst of the present invention may be employed at temperatures of 350–550° F. At these temperatures, cobalt is insensitive to carbon monoxide but will not overhydrogenate aldehydes to alcohols as nickel would do in this area.

The process of preparing such a catalyst, particularly one supported on preformed activated carbon pellets, presents several important problems. The most convenient method of preparing such a catalyst is by impregnation of the char pellets with an aqueous solution of a heat-decomposable salt, and then reducing the oxide formed. However, a severe limitation exists as to the availability of such salts. The nitrate cannot be employed. Though this salt is highly water-soluble and on decomposition produces the oxide, the reaction of the oxides of nitrogen with the carbon support produces unstable materials having detonating properties. Organic salts of cobalt have hitherto been not too satisfactory because of the limited water solubility of even the lowest cobalt carboxylates. Thus, cobalt formate has a water-solubility of about 20 grams cobalt/liter and cobalt acetate of about 75 grams cobalt/liter. This requires repeated impregnation to form a catalyst having sufficient cobalt content.

It is well known in the art that hydrogenation catalysts having a high proportion of metal on the carrier are most desirable. Such catalysts are generally more active and less susceptible to poisons than those having lower metal content. Thus, among the nickel-kieselguhr catalysts used commercially, those containing 50% or more nickel on the carrier are most common. Catalysts containing such high metal contents are readily prepared by the precipitation methods which do not generally give catalysts of the high mechanical strength, which is very desirable when the catalyst is to be used for hydrogenation in the presence of water. The commercial extruded forms of activated carbon are ideal supports for preparing catalysts of high mechanical strength but because of limitations in the impregnation methods of catalyst preparation which must be used to achieve the high mechanical strength, about 20–30% metal on the carrier is generally considered maximum. Principally because of solubility limitations of the metal salts in aqueous solution, these concentrations of metal generally require multiple impregnation of the carrier. Thus, it is very desirable to employ impregnating solutions which contain high concentrations of the metallic ions, as this gives the greatest deposition per impregnation of the carrier. Consequently, cobalt solutions containing more than the 75 grams of cobalt/liter limit of cobalt acetate would be very desirable for preparation of hydrogenation catalysts by impregnation methods.

In accordance with the present invention, it has now been found that supported catalysts on activated char may be prepared by impregnating preformed pellets with aqueous solutions of $Co[Co(CO)_4]_2$, resulting in catalyst compositions having substantially higher proportions of cobalt than obtainable by other means of impregnation. Catalysts containing up to 20% and higher of cobalt are thus readily available.

It has been found that when dilute aqueous acid decobalting of cobalt-contaminated aldehyde product is carried out under partial pressure of $H_2$ and CO of about 10–100 p. s. i., and higher, the acid treatment does not convert, even at the relatively high temperatures of 150–200° F., the cobalt carbonyl dissolved in the aldehyde product substantially into the corresponding acid salt, i. e., cobalt acetate if acetic acid is used to decobalt. Instead of the expected hydrolytic reaction, under these circumstances, i. e., in the presence of CO and $H_2$, it has been discovered that a substantial proportion of the cobalt in the water layer is present as the anion rather than as the cobaltous cation. Analysis of the recovered water layer has shown that 30–50% and more of the total cobalt is present as the anion $Co(CO)_4^-$, and the corresponding salt, $Co(Co(CO)_4)_2$.

By decobalting by injecting aqueous acid into the decobalter at elevated temperatures and under definite partial pressure of synthesis gas, one is enabled to obtain an aqueous solution of cobalt which not only contains that element in a highly active catalyst form, i. e. as the $Co(CO_4)^-$ ion, which therefore does not require formation of that material in the initial reaction zone, but also, one is enabled to recover aqueous solutions of cobalt having a considerably higher concentration of that element than would be possible if cobalt were recovered as the low molecular weight organic acid salt, such as cobalt acetate or formate. Thus, though the solubility of cobalt acetate in water is about 7.5% (weight) as cobalt, aqueous solutions containing 9–10% cobalt, and even higher, have been obtained. The salt $Co(Co(CO)_4)_2$ has a cobalt content of 44% compared to 23% for cobalt acetate (tetrahydrate). This, therefore, provides an aqueous solution of higher cobalt content than has hitherto been available. The unusual thermal and storage stability of the aqueous solution of the cobalt anion and cation is a matter of surprise. It may be stored indefinitely without special precaution other than exclusion of contact with air without decomposing significantly. In addition, this solution may be concentrated, with little or no decomposition, by distilling off water at atmospheric pressures, thus obtaining cobalt concentrations in water of any desired value up to 20%. This step is not possible with cobalt acetate or formate, because of their limited water solubility.

In accordance with a preferred embodiment of the present invention, the cobalt salt resulting from acid decobalting with or without concentration, is employed to impregnate the preformed activated char pellets. It has further been found that the char itself preferentially decomposes the cobalt anion, thus rendering the residual cobalt solution from the impregnation more amenable to conversion to oil soluble carbonylation catalysts, such as cobalt oleate.

The present invention will best be understood from the more detailed description hereinafter, wherein reference will be made to the accompanying drawing, which is a schematic representation of a system suitable for carrying out a preferred embodiment of the invention.

Turning now to the figure, olefin feed is passed after preheating in a fired coil (not shown) through feed line 4 to the bottom portion of primary reactor 2. The latter comprises a reaction vessel which may, if desired, be packed with non-catalytic material, such as Raschig rings, pumice, and the like, and may be divided into discrete packed zones.

Catalyst may be injected as an oil-soluble cobalt soap, such as cobalt oleate or naphthenate, or the like, along with the olefin, in amounts equivalent to about 0.1–0.5% of cobalt on olefin. Also, inasmuch as the aqueous cobalt solution is stable on storage, aqueous cobalt solution containing Co(Co(CO)₄)₂ from a previous operation may be employed.

A gas mixture comprising preferably approximately equal volume of H₂ and CO is supplied through line 3 to primary reactor 2 and flows concurrently with the olefin feed. Reactor 2 is preferably operated a a pressure of about 2500–3500 p. s. i. g. and at a temperature of about 200–450° F., depending upon the olefin feed and other reaction conditions.

Liquid oxygenated reaction product containing catalyst in solution and unreacted synthesis gas, is withdrawn overhead from an upper portion of reactor 2, and transferred through line 8 and cooler 10 to high pressure separator 12, which is maintained at pressures of about the same order of magnitude as reactor 2, and wherein a portion of the unreacted H₂ and CO are withdrawn overhead through line 14, and preferably, at least in part, recycled. A portion may be withdrawn through line 18, and employed in the mixer-decobalter to maintain the requisite CO—H₂ pressure in that zone.

A stream of primary reaction product containing dissolved therein relatively high concentration of cobalt carbonyl and other forms of cobalt is withdrawn from separator 12 through line 20. A portion of this stream may be recycled to reactor 2, via line 22 to aid in cooling and maintenance of temperature control of the primary carbonylation stage. The balance of the primary reaction product is now passed, without degassing or with only partial degassing, to the mixing zone 26.

This unit is of any conventional design and is adapted to mix thoroughly an aqueous and a water-insoluble liquid organic phase. Water is injected through line 30, and an organic acid of low molecular weight, such as acetic, formic, and the like, is added through line 28. About 5 to 15% (based on aldehyde) of a 10% aqueous solution of acetic acid may be employed. Substantially less water is required than if the solubility limitations of cobalt acetate had to be met.

The temperature level within mixer 26 must be carefully controlled. High temperatures speed the reaction rate, but too high temperatures result in thermal decomposition of cobalt carbonyl to metallic cobalt, which is difficultly soluble in the dilute acid mixture, and this is undesirable. The temperature within mixing zone 26 is preferably maintained at about 150–185° F., and should not exceed about 200° F.

Within zone 26, there is maintained a carbon monoxide and hydrogen partial pressure of about 10 to 150 pounds, preferably 50 to 100 p. s. i. This is contrary to prior art processes, where purge gases have been employed to remove CO in order to hasten the decomposition of the dissolved cobalt carbonyl. In the present operation, however, it is desirable, and necessary, to maintain a definite CO partial pressure in order to obtain the high concentration aqueous cobalt solution already described. This can be conveniently accomplished by using relatively fresh cobalt containing aldehyde without appreciable degassing. The dissolved CO in the aldehyde will then supply the necessary CO in the acid extraction zone. If necessary, additional H₂ and CO may be admitted through line 33; purge gas from 18 may be thus used.

After a sufficient period of mixing, about 30–120 minutes, the mixture is passed through line 32 to settler 34, where the aqueous and aldehyde layers are allowed to stratify. The upper aldehyde layer may then be passed to water washer 36, where hot water, at about 150–170° F., may be injected through line 37, to wash out the last traces of cobalt and acid. About 10% water may be used, and the wash water, withdrawn through line 39, may advantageously be concentrated in concentrator 45, and employed as the diluent for the organic acid used as the decobalting medium.

Overhead from 36, there is withdrawn through line 41, the substantially completely decobalted aldehyde product which may be passed to storage for subsequent conversion into alcohols in hydrogenation oven 50, which contains the catalyst of the present invention.

The lower aqueous layer, now containing in solution substantial quantities of Co(Co(CO)₄)₂, as well as some cobalt acetate is withdrawn from settler 34, through line 35. The solution may, if desired, be even further concentrated in unit 38, by a simple distillation and removal of water over head. This may be carried out even at atmospheric pressures without significant decomposition of the cobalt material. If desired, concentration may be carried out at diminished pressures, or omitted entirely. If the latter, concentrator 38, is avoided by by-pass line 40. The aqueous solution containing 5 to 20% by weight of cobalt, is passed to storage chamber 42, and is pumped as needed through line 44 into the catalyst impregnation zone 48. The balance of the aqueous solution may be recycled to aldehyde synthesis reactor 2. In the catalyst impregnation zone, the desired carrier is treated with concentrated cobalt solution for 1 to 40 hours at temperatures of 70–200° F. and dried after the impregnating solution is drained off. Multiple impregnations may be used to give high concentrations of cobalt on the carrier. The catalyst is then transferred to the hydrogenation zone.

Hydrogenation zone 50 contains as catalyst activated char carrying as hydrogenating constituent reduced cobalt, prepared in a manner described below. The aldehyde product is hydrogenated at a temperature of about 350 to 550° F. and pressures of about 1500 to 4500 p. s. i. g. hydrogen. Preferably about 8–10% water is added via line 52 to aid in alcohol selectivity. The crude alcohol product is withdrawn through line 54 for further purification by known distillation processes.

The process of the present invention may be modified in several ways. Thus, though the process has its highest utility when operated in conjunction with an acid decobalting operation, nonetheless, the solution of Co[Co(CO₄)]₂ may also be prepared by decobalting the cobalt hydrocarbonyl containing aldehyde product with a water soluble cobalt salt. Another way is to react a cobalt salt with water and synthesis gas in the presence of a water insoluble aldehyde or alcohol.

The present invention may be further illustrated by the following specific examples.

*Example I*

"Columbia" activated carbon pellets (231 grams) were placed in a tube and flushed with natural gas to remove air. The charcoal was treated with 400 ml. of a solution from acid decobalting (analysis below) for about 18 hours. Upon first contacting the charcoal, a vigorous reaction involving liberation of heat, and copious volumes of gases resulted. The reaction subsided after about one hour. The liquid drawn off (235 cc.) showed the analysis indicated below. The charcoal-catalyst was dried in vacuum at 60° C. The dried catalyst was then subjected to a second impregnation using the same procedure except that the base was kept in contact with the solution for about 40 hours and the catalyst dried at 70° C. The impregnating and spent solutions showed the following analysis:

|  | Impregnating Solution | Solution from 1st Impregnation | Solution from 2nd Impregnation |
| --- | --- | --- | --- |
| Anionic Cobalt, Wt. Percent | 2.96 | 0.60 | 0.45 |
| Cationic Cobalt, Wt. Percent | 4.41 | 3.75 | 3.75 |
| Percent of Total Cobalt as Anion | 40 | .14 | 13 |

Based on the analyses of the charged and recovered solutions, the carrier contained about 8.5 wt. percent cobalt after the first impregnation. This compares with about 9–10% cobalt in preparation of similar catalysts by impregnation of the activated carbon with saturated aqueous solutions of cobaltous acetate (solutions containing about 7–8 gms. of cobalt per 100 ml. solution).

Hydrogenation activity tests were carried out in shaker autoclaves on the cobalt char catalyst prepared by the above technique in comparison with a similar catalyst prepared by impregnating activated carbon with cobaltous acetate. Both catalysts were given two impregnations and contained 17–20% cobalt on the activated carbon base. The results are shown in the following table.

| Run No. | A | B | C | D |
|---|---|---|---|---|
| Catalyst | Cobalt on Carbon | | | $MoS_2$ on Carbon. |
| Solution used in Impregnation. | Cobaltous Acetate. | Acid Decobalter Solution | | |
| Reduction Treatment | $H_2$ (700–800° F.) | | None | |
| | (About 20% Catalyst on Feed) | | | |
| Hydrogenation Conditions: | | | | |
| Feed | $C_5$ Aldehyde from Oxonation of Butenes | | | |
| Temp., °F | 450 | 450 | 450 | 475. |
| $H_2$ Pressure p. s. i. g | 2,900 | 2,900 | 2,900 | 2,750. |
| Time, Hours | 6 | 6 | 6 | 4. |
| Product Carbonyl Number. | 1 | Nil | 27 | 8. |
| Amyl Alcohol Yield, Percent. | 74 | 74 | 63 | 62. |
| Alcohol Purity, Percent. | 98 [1] | 98 [1] | | 94–97.[1] |

[1] Impurity is principally $C_{10}$ hydrocarbon.

These results show that the catalyst prepared from the acid decobalter solution was fully equivalent to that prepared from C. P. cobaltous acetate solution and superior in activity, selectivity and product purity to a hydrogenation catalyst consisting of molybdenum sulfide on the same carrier. The latter type of catalyst often gives an amyl alcohol which is contaminated with appreciable amounts of $C_{10}$ hydrocarbon, while the cobalt catalysts gave little or no hydrocarbon contamination.

*Example II*

An acid decobalting solution was concentrated by distilling off water at atmospheric pressure. Analyses of the starting solution and concentrate were as follows:

| | Acid Decobalter Solution | Concentrated Solution |
|---|---|---|
| Anionic Cobalt, percent | 2.96 | 7.3 |
| Cationic Cobalt, percent | 4.41 | 5.9 |
| Total Cobalt, percent | 7.37 | 13.2 |
| Percent of Total Cobalt in Anion Form | 40 | 55 |

Columbia activated carbon (476 gms.) was treated with 750 ml. of the concentrated solution and allowed to stand for 22 hours. There was a pronounced temperature increase and gas evolution when the base was first contacted with the solution. The solution recovered from the impregnation amounted to 370 ml. and contained 4.86% cationic cobalt and 3.22% anionic cobalt. This catalyst after one impregnation was calculated to contain 14.5% cobalt.

*Example III*

An aqueous solution from acid decobalting was concentrated in two stages at atmospheric pressure. Analyses on the original solution and on the concentrates were as follows:

| | Original | 1st Concentration | 2nd Concentration |
|---|---|---|---|
| Anionic Cobalt, percent | 2.96 | 5.65 | 10.6 |
| Cationic Cobalt, percent | 4.41 | 5.35 | 8.18 |
| Total Cobalt, percent | 7.37 | 11.0 | 18.8 |
| Percent of Total Cobalt in Anion Form | 40 | 51 | 57 |

As shown by the relationship illustrated in Figure 2, the solution of dissolved cobalt obtained in this example will give a catalyst containing about 20% by weight cobalt on the carrier per impregnation.

*Example IV*

This example is designed to show the advantages in catalyst activity for the higher cobalt concentrations on the carrier. Hydrogenations of butyl and amyl aldehyde feeds were carried out in shaker autoclaves using about 15 wt. percent catalyst on feed at the indicated conditions of temperature and pressure. The time required for gas absorption to be essentially complete is taken as an index of hydrogenation rate and catalyst activity.

| Run | A | B | C |
|---|---|---|---|
| Catalyst prepared from | Co Acetate | $Co(Co(CO)_4)_2$ | |
| Approx. percent Co on Carrier | 20 | 9 | 18 |
| Hydrogenation Conditions: | | | |
| Temperature, °F | 450 | 450 | 400 |
| $H_2$ Pressure, p s. i. g | 2,900 | 2,900 | 1,500 |
| Time, Hrs. for Complete Gas Absorption. | 1.3 | 1.3 | 1.0 |

On the basis of this invention, the catalyst prepared from the decobalter solution and tested in run C was considerably more active under relatively milder hydrogenation conditions than a catalyst containing an approximately equivalent amount of cobalt prepared from cobalt acetate and tested in run A. Under the conditions of run C, considerable overhydrogenation was experienced attesting to the high activity of this catalyst. Run B in comparison with run A shows about the same activity but at a much lower cobalt content for the catalyst prepared from the decobalter solution.

What is claimed is:

1. An improved aldehyde hydrogenation catalyst comprising reduced cobalt supported on preformed activated carbon pellets and prepared by impregnating said pellets with the cobalt salt of a cobalt carbonyl.

2. The catalyst of claim 1 wherein said cobalt comprises at least 10% of said composition.

3. An improved process for preparing active aldehyde hydrogenation catalysts, which comprises impregnating a preformed activated carbon pellet support with an aqueous solution of $Co[Co(CO)_4]_2$, and thereafter drying said impregnated material.

4. The process of claim 3 wherein said impregnation is carried out at a temperature of from about 70–200° F.

5. In the production of alcohols by reacting olefins with CO and $H_2$ in a carbonylation stage at elevated temperatures and pressures in the presence of a cobalt catalyst, hydrogenating the oxygenated product in the presence of a hydrogenation catalyst under liquid phase hydrogenation conditions of temperature and pressure, and recovering a hydrogenated product rich in alcohols, the improvement which comprises carrying out said hydrogenation in the presence of a catalyst consisting essentially of a major proportion of preformed activated carbon pellets supporting a minor proportion of cobalt, said catalyst having been prepared by impregnating preformed charcoal pellets with an acqueous solution of $$Co[Co(CO)_4]_2$$

6. The process of claim 5 wherein said hydrogenation is carried out in the presence of up to 10% of water based on liquid feed.

7. The process of claim 5 wherein said catalyst contains about 10–20% cobalt.

8. The process of claim 5 wherein said hydrogenation temperatures are about 350–550° F.

9. In a carbonylation process wherein olefinic carbon compounds are contacted in a carbonylation zone with CO and $H_2$ in the presence of cobalt catalyst under conditions to produce reaction products comprising aldehydes containing at least one more carbon atom than said olefinic compounds and wherein a solution comprising said reaction products and dissolved cobalt catalyst is transferred to a catalyst removal zone, and wherein the cobalt-free reaction product is hydrogenated to the corresponding alcohol, the improvement which comprises contacting said cobalt-contaminated aldehyde product with an aqueous solution of an organic acid in said catalyst removal zone, maintaining a temperature of about 150–200° F. and a pressure of $H_2$ and CO of at least 10 p. s. i. g. in said zone, converting cobalt compounds dissolved in said aldehyde product into water soluble forms of cobalt, recovering an aqueous solution of cobalt wherein said element is present in cationic and anionic forms, impregnating preformed activated carbon pellets with at least a portion of said solution, drying said impregnated pellets, and hydrogenating said cobalt-free aldehyde product in the presence of said cobalt-impregnated preformed activated char pellets.

10. The process of claim 9 wherein said aqueous solution is concentrated prior to impregnation of said pellets.

11. The process of claim 9 wherein said acid is acetic acid.

12. The process of claim 9 wherein $H_2$ and CO pressure is about 10 to about 150 p. s. i. g.

References Cited in the file of this patent

UNITED STATES PATENTS

| 2,407,813 | Cheney | Sept. 17, 1946 |
| 2,407,814 | Cheney | Sept. 17, 1946 |
| 2,614,107 | Wender et al. | Oct. 14, 1952 |
| 2,620,362 | Stiles | Dec. 2, 1952 |
| 2,638,488 | Cerveny | May 12, 1953 |
| 2,671,119 | Mertzweiller | Mar. 2, 1954 |
| 2,713,073 | Smith | July 12, 1955 |

FOREIGN PATENTS

| 664,974 | Great Britain | Jan. 16, 1952 |

OTHER REFERENCES

Groggins: Unit Processes, 4th edit. (1952), McGraw-Hill, N. Y.; pp. 561–4, 567.

Wender et al.: J. A. C. S., vol. 72 (1950), pp. 4842–3.

Wender et al.: J. A. C. S., vol. 74 (1952), 4080.

Berty et al.: Acta Chim. Acad. Sci. Hung., vol. 3 (1953), pp. 177–85 (in English).